United States Patent [19]

Ueno et al.

[11] Patent Number: 5,022,279
[45] Date of Patent: Jun. 11, 1991

[54] RACK AND PINION STEERING DEVICE

[75] Inventors: Hiroshi Ueno; Shoji Hatabu; Hirokazu Arai, all of Osaka, Japan

[73] Assignee: Koyo Seiko Co., Ltd., Osaka, Japan

[21] Appl. No.: 430,464

[22] Filed: Nov. 2, 1989

[30] Foreign Application Priority Data

Nov. 8, 1988 [JP] Japan ............................ 63-145812[U]
Nov. 8, 1988 [JP] Japan ............................ 63-145814[U]

[51] Int. Cl.$^5$ .......................... F16H 1/04; B62D 3/12
[52] U.S. Cl. .......................................... 74/422; 74/498
[58] Field of Search ...................... 74/498, 422, 424.6, 74/29

[56] References Cited

U.S. PATENT DOCUMENTS

| | | | |
|---|---|---|---|
| 4,593,578 | 6/1986 | Kobayashi et al. | 74/498 |
| 4,785,685 | 11/1988 | Kobayashi et al. | 74/498 |
| 4,800,770 | 1/1989 | Kobayashi et al. | 74/422 |

FOREIGN PATENT DOCUMENTS 2748011  5/1978  Fed. Rep. of Germany ........ 74/422

*Primary Examiner*—Allan D. Herrmann
*Assistant Examiner*—David W. Laub
*Attorney, Agent, or Firm*—Armstrong, Nikaido, Marmelstein, Kubovcik & Murray

[57] ABSTRACT

A housing has accommodated therein a hollow cylindrical rack guide made of synthetic resin and pressed against a rack bar by a spring for guiding the rack bar and preloading the rack relative to the pinion, the rack guide being formed in its one end face with a guide groove for guiding the rack bar. The rack guide is shaped in the form of a double cylinder having an inner cylindrical portion and an outer cylindrical portion by being formed in the other end face thereof with a circular spring accommodating cavity and an annular groove positioned around the cavity concentrically therewith, a plurality of ribs being formed in the annular groove between the inner and outer cylindrical portions diametrically thereof and including ribs parallel to the guide groove, the inner cylindrical portion having an end face flush with or projecting beyond the end face of the outer cylindrical portion, at least the ribs parallel to the guide groove each having an end face flush with the end face of the inner cylindrical portion.

6 Claims, 4 Drawing Sheets

RACK AND PINION STEERING DEVICE

BACKGROUND OF THE INVENTION

The present invention relates to rack and pinion steering devices for use in motor vehicles and the like.

FIG. 10 shows a rack and pinion steering device already known for use in motor vehicles.

With reference to FIG. 10, a pinion shaft 5 is rotatably supported by a housing 1 with bearings 2, 3 and an oil seal 4 provided therein around the shaft. Meshing with a pinion 6 formed at an intermediate portion of the pinion shaft 5 is a rack 8 formed on the rear side of a rack bar 7 extending through the housing 1 transversely thereof. The housing 1 is integral with a hollow cylindrical portion 9 projecting forward from the front side thereof. A cap 10 is screwed in the front end of the cylindrical portion 9 and fixed thereto with a lock nut 11. A rack guide 12 is fitted in between the cap 10 and the rack bar 7 in the cylindrical portion 9 so as to be slightly movable forward or rearward. The rack guide 12 is formed in its rear end with a guide groove 13 having the cylindrical front face of the rack bar 7 fitted therein to guide the bar 7. The guide groove 13 is defined by upper and lower rearward projections 14. The cap 10 and the rack guide 12 are formed in their opposed faces with circular spring accommodating cavities 15, 16, respectively, having a coiled compression spring 17 disposed therein. The rack guide 12 is pressed against the rack bar 7 by the spring 17 to guide the rack bar and preload the rack 8 relative to the pinion 6. A small clearance is provided between the cap 10 and the rack guide 12.

Although the rack guide was prepared from sintered alloy or the like in the past, those made of synthetic resin have been placed into wide use in recent years since they permit smooth movement of the rack bar, and are lightweight, diminished in impact noise and inexpensive. When the rack guide is prepared from synthetic resin, injection molding is generally resorted to.

While the rack guide must fulfill the requirements as to both strength and precision, the use of synthetic resin for the rack guide involves the following problems.

Insofar as the strength requirement is concerned, the rack guide will be satisfactory when made in the form of a block having no clearance, whereas the product then deforms greatly owing to the shrinkage involved in injection molding, hence a problem in respect of precision. Accordingly, the rack guide is prepared in the form of a hollow cylinder, but a problem then arises with respect to strength. More specifically stated with reference to FIG. 10, the rack guide 12 collides with the cap 10 secured to the housing cylindrical portion 9 when subjected to a force from the rack bar 7. At this time, the cylindrical portion only of the rack guide 12 is subjected to a force upon striking against the cap 10. The rack guide is therefore likely to break, failing to withstand the great force.

Furthermore, it is difficult to prepare the rack guide from synthetic resin by a single cycle of injection molding in view of its shape. Even if this is possible, another problem is encountered in that the product undergoes post-process changes (thermal expansion, thermal contraction and hygroscopic swelling) which involve directionality.

More specifically, in the case where the rack guide 12 of FIG. 10 is injection-molded, the molding tends to shrink during cooling at the rear end portion where the guide groove 13 is formed, and becomes tapered toward the rear end. If the rear end portion shrinks uniformly in its entirety in this case without any directionality in the degree of shrinkage of this portion, it is possible to make the entire rack guide 12 uniform in outside diameter by dimensionally adjusting the molding die. However, it is impossible to give a uniform outside diameter to the entire rack guide 12 by adjusting the dimensions of the die since the degree of shrinkage is actually greater in the direction in which the projections 14 approach each other. Additionally, the molding synthetic resin flows in the direction in which the guide groove 13 extends, with the result that the filler used, such as glass fiber, becomes oriented in the horizontal direction (i.e., the direction perpendicular to the plane of FIG. 10) in the portions forming the projections 14. Consequently, the filler fails to greatly reinforce the projections 14 by acting against the fall of these portions.

SUMMARY OF THE INVENTION

The main object of the present invention is to overcome the foregoing problems and provide a rack and pinion steering device having a synthetic resin rack guide which is excellent in both strength and precision.

The present invention provides a rack and pinion steering device wherein a housing has accommodated therein a hollow cylindrical rack guide made of synthetic resin and pressed against a rack bar by a spring for guiding the rack bar and preloading the rack relative to the pinion, the rack guide being formed in its one end face with a guide groove for guiding the rack bar. The device is characterized in that the rack guide is shaped in the form of a double cylinder having an inner cylindrical portion and an outer cylindrical portion by being formed in the other end face thereof with a circular spring accommodating cavity and an annular groove positioned around the spring accommodating cavity concentrically therewith, a plurality of ribs being formed in the annular groove between the inner and outer cylindrical portions diametrically thereof and including ribs parallel to the guide groove, the inner cylindrical portion having an end face flush with or projecting beyond the end face of the outer cylindrical portion, at least the ribs parallel to the guide groove each having an end face flush with the end face of the inner cylindrical portion.

Preferably, the corners of the ribs in the annular groove are rounded.

Further preferably, the spring bearing portion in the spring accommodating cavity is provided with a rib parallel to the guide groove and a rib intersecting this rib at right angles therewith.

Since the rack guide is in the form of a hollow double cylinder, the rack guide is made uniform in its overall wall thickness, diminished in deformation due to the shrinkage involved in injection molding and given improved precision. Further because the end face of the inner cylindrical portion is flush with or projects beyond the end face of the outer cylindrical portion, with the annular groove ribs parallel to the guide groove made flush with the end face of the inner cylindrical portion, at least the inner cylindrical portion and the ribs parallel to the guide groove collide with the cap or the like at the same time. The rack guide has increased strength and is resistant to damage or breaking because the plurality of ribs are provided between the inner and outer cylindrical portions and because at least the inner cylindrical portion and the ribs parallel to the guide groove are adapted to collide with the cap or the like at the same time.

The ribs in the annular groove, when rounded at their corners, impart further increased strength to the rack guide.

In the case where the rib parallel to the guide groove and the rib intersecting this rib at right angles therewith are formed at the spring bearing portion in the spring accommodating cavity, the synthetic resin injected from a gate portion at the center of the guide groove of the rack guide to be formed by injection molding flows dividedly in four directions through the portion of the rib to be formed in parallel to the guide groove at the spring bearing portion in the rear of the gate and through the rib portion intersecting the rib portion. This diminishes the directionality of changes after the molding process. More particularly, the filler used is oriented vertically in the projections and therefore acts against the shrinkage of the projections, reducing the tendency for the projections to fall and consequently diminishing the directionality of post-process changes of the synthetic resin rack guide made by injection molding to give higher dimensional accuracy to the rack guide.

DESCRIPTION OF THE PREFERRED EMBODIMENTS

Figure 1:
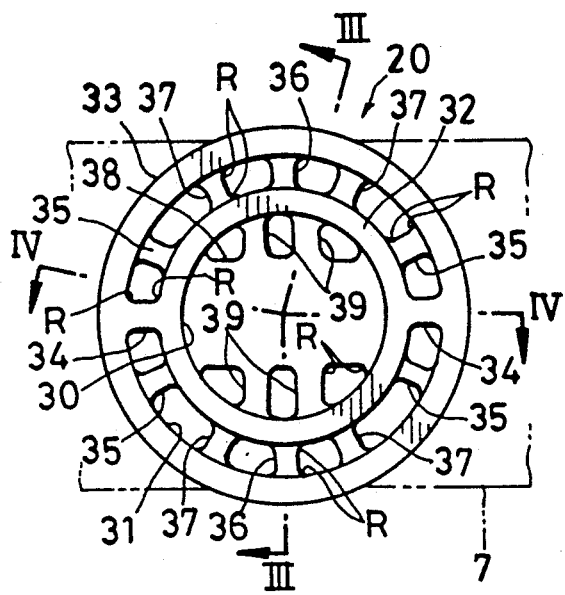
FIG. 1 is a front view showing an example of rack guide for use in a rack and pinion steering device embodying the invention.
Figure 2:
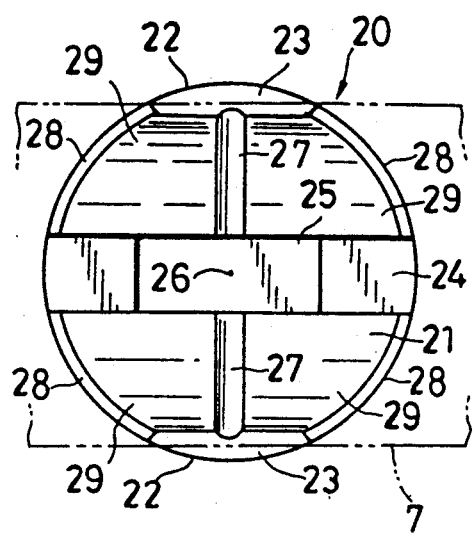
FIG. 2 is a rear view of the same.
Figure 3:
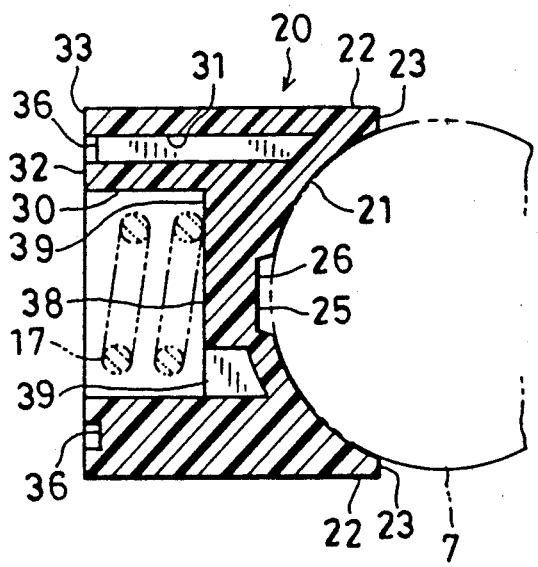
FIG. 3 is a view in section taken along the line III—III in FIG. 1.
Figure 4:
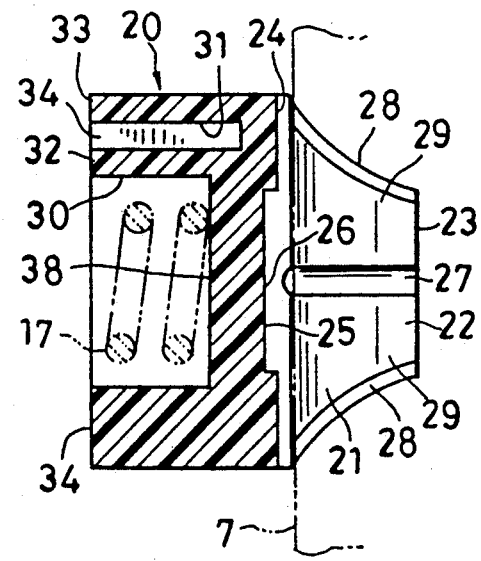
FIG. 4 is a view in section taken along the line IV—IV in FIG. 1.
Figure 5A:
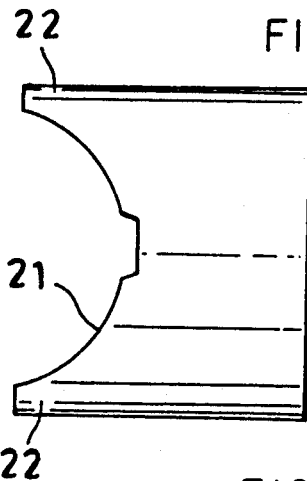
FIGS. 5(a)-5(d) and FIGS. 6(a)-6(d) are diagrams showing specimens prepared for a crushing test.
Figure 6A:
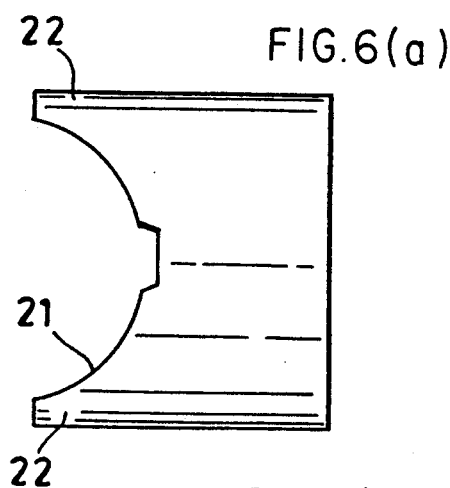
Figure 5B:
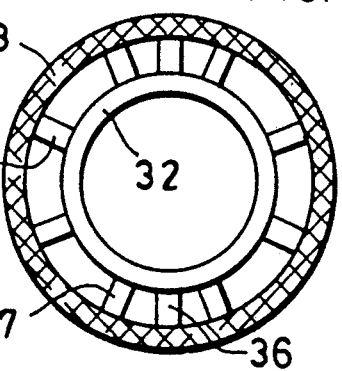
Figure 6B:
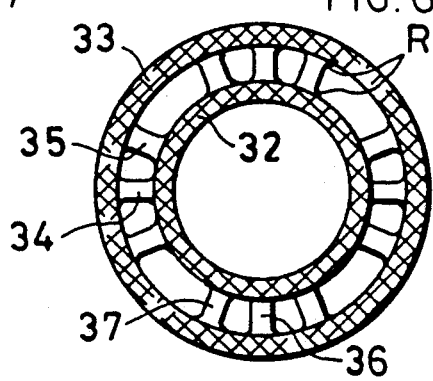
Figure 5C:
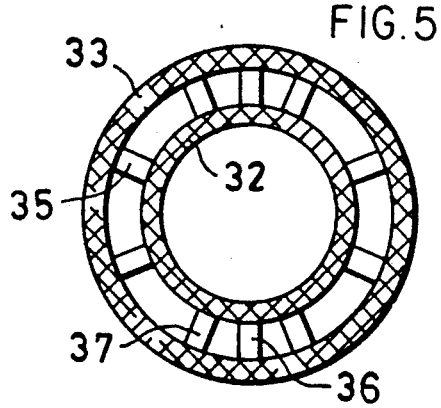
Figure 6C:
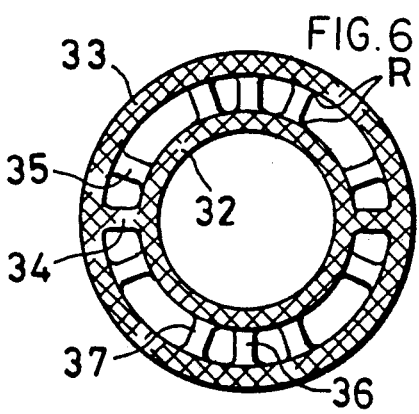
Figure 5D:
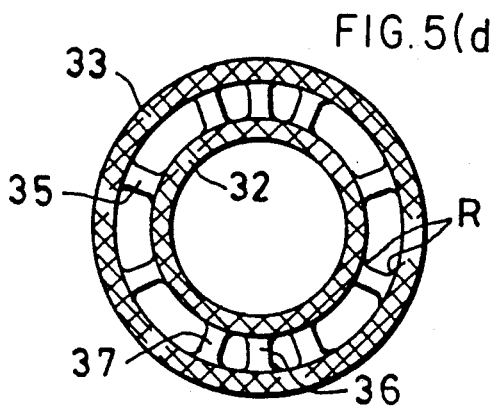
Figure 6D:
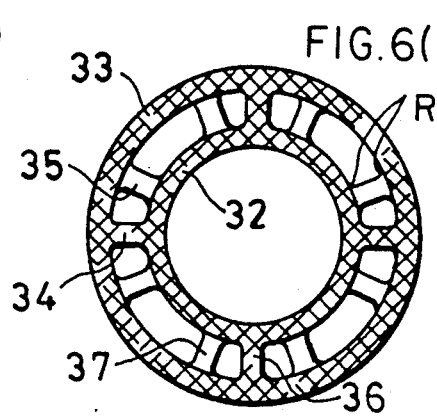

With reference to FIGS. 1 to 9, embodiments of the invention will be described below as the invention is applied to a rack and pinion steering device for motor vehicles. These drawings show rack guides for the steering device on an enlarged scale.

FIGS. 1 to 4 show one embodiment.

The illustrated rack guide 20 is similar to the conventional one in contour and is formed at its rear end with a guide groove 21 and projections 22. The rear ends of the projections 22 are cut off so as to be parallel to the front end face of the guide and to form flat faces 23. The guide groove 21 has a circular-arc cross section in conformity with the cylindrical front face of the rack bar 7 and has in its bottom a clearance groove 24 extending longitudinally thereof. A shallow recess 25 is formed in the middle of the bottom of the clearance groove 24. An injection molding gate 26 is positioned at the bottom of the recess 25 centrally thereof. The guide groove 21 is further provided with oil grooves 27 perpendicular to the clearance groove 24 and extending from the groove 24 to the respective flat faces 23 of the projections 22. The projections 22 are chamfered as at 28 along their side edges. The portions surrounded by the flat faces 23 along the guide groove 21, the clearance groove 24, the oil grooves 27 and the chamfers 28 are slide guide faces 29 for guiding the rack bar 7.

The rack guide 20 is formed in its front end face with a circular spring accommodating cavity 30 centrally thereof and an annular groove 31 around the cavity 30 concentrically therewith. Thus, the rack guide 20 is in the form of a double cylinder having an inner cylindrical portion 32 and an outer cylindrical portion 32. The front end faces of the inner and outer cylindrical portions 32 and 33 are flush with each other. A plurality of ribs 34, 35, 36 and 37 are formed in the annular groove 31 between the inner and outer cylindrical portions 32 and 33 diametrically thereof. More specifically, these ribs are two ribs 34 parallel to the guide groove 21, four slanting ribs 35 slightly slanting with respect to ribs 34, two vertical ribs 36 perpendicular to the guide groove 21, that is, extending in a direction interconnecting the projections 22, and four inclined ribs 37 slightly inclined with respect to ribs 36. Of these grooves, the front faces of the groove-paralleling ribs 34 only are flush with the front end faces of the inner and outer cylindrical portions 32 and 33. The front faces of the other ribs 35, 36 and 37 are positioned slightly inside the annular groove 31, i.e., slightly rearward from the front end faces of the inner and outer cylindrical portions 32 and 33. The corners of the ribs 34 to 37 are rounded as indicated at R. The inner cylindrical portion 32 is internally formed with a rib 38 in parallel to the guide groove 21 and having a relatively large width. Two ribs 39 extend from each side of the rib 38 to the inner periphery of the inner cylindrical portion 32 perpendicular to the rib 38. The front faces of these ribs 38 and 39 are flush with one another and are positioned a considerable distance rearwardly away from the front end face of the inner cylindrical portion 32. These front faces support one end of the spring 17. These ribs 38 and 39 are also rounded at their corners as indicated at R.

The rack guide 20 is prepared by injection molding. The synthetic resin injected from the portion of gate 26 for injection molding flows dividedly in four directions through the portion of the groove-paralleling rib 38 and the portions of the ribs 39 perpendicular thereto which are inside the inner cylindrical portion 32 behind the gate 26.

For example, when the perpendicular ribs 39 are not to be formed inside the inner cylindrical portion 32, the synthetic resin is filled in the direction parallel to the guide groove 21, then filled in the directions perpendicular to the groove and further filled into the portions of the projections 22 in the direction parallel to the guide groove 21. The reinforcing fiber incorporated in the resin is of course oriented in the same direction as the flow of the resin. Consequently, the resin shrinks markedly in the direction in which the projections 22 approach each other during cooling, so that the post-process changes exhibit marked directionality.

In the case of the rack guide 20, on the other hand, the synthetic resin is filled in the four directions at the same time, with the result that the reinforcing fiber is oriented in the portions of the projections 22 perpendicular to the guide groove 21. Accordingly, the directionality of the changes subsequent to the molding process is diminished. Further with the gate 26 positioned centrally of the rack guide, the resin can be filled smoothly, whereby the occurrence of weld marks and the like can be precluded.

Figure 10:
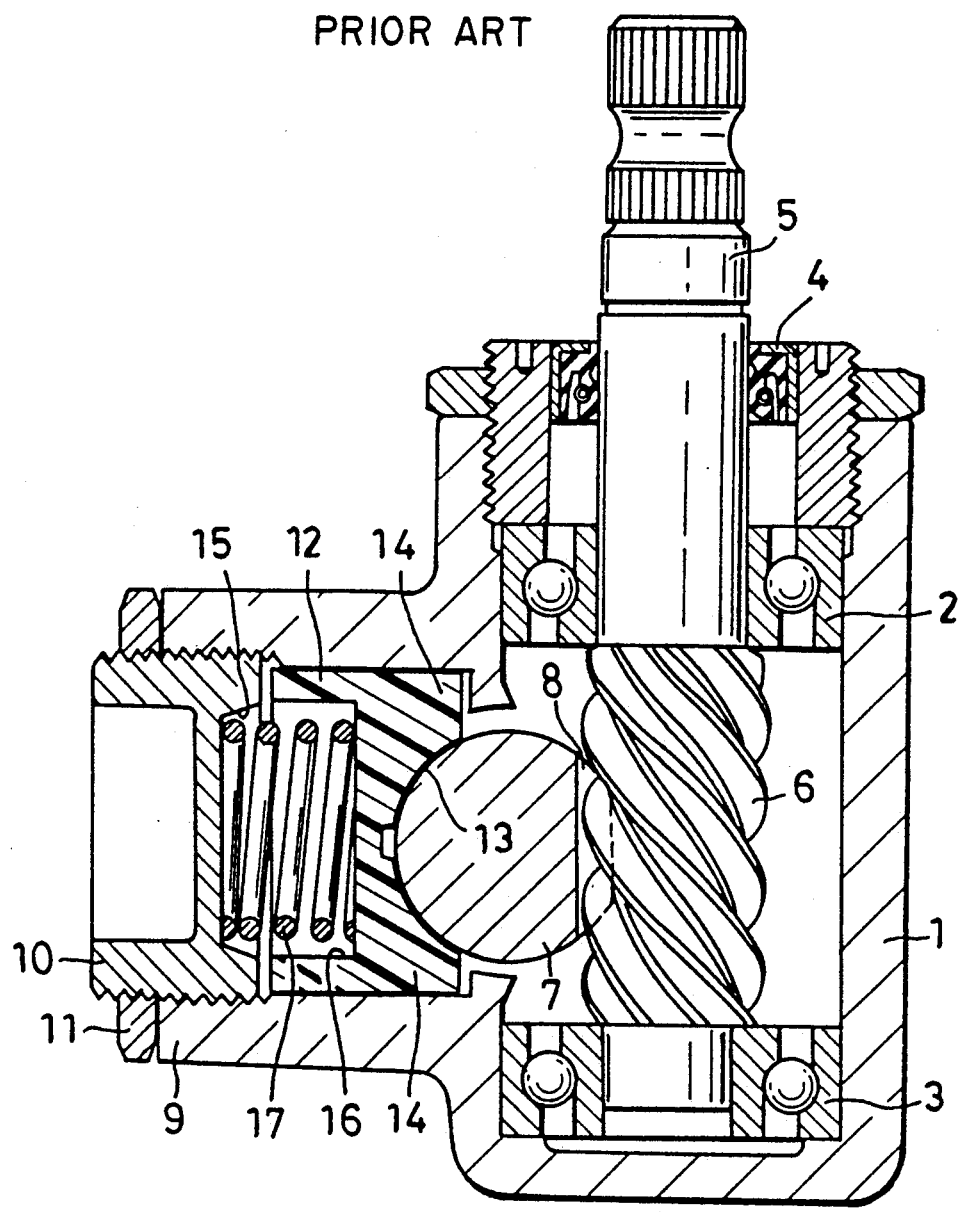
FIG. 10 is a view in vertical section showing a conventional rack and pinion steering device.

Although the rack guide 20 collides with the cap 10 (see FIG. 10) when subjected to a force by the rack bar 7, the guide exhibits high strength because the plurality of ribs 34 to 37 are formed between the inner and outer cylindrical portions 32 and 33 and are rounded as at R at their corners and further because the front faces of the inner and outer cylindrical portions 32, 33 and the groove-paralleling ribs 34 are flush with one another and strike against the cap 10 at the same time to withstand the force.

The results of a strength test will be described next with reference to FIGS. 5(a) to 7.

Six kinds of specimens (rack guides) were prepared as shown in FIGS. 5(a) through 6(d). In each diagram of FIGS. 5(a) through 6(d), the hatched portion is positioned forward from the unhatched portion and is the portion to be brought into contact with the cap 10.

COMPARATIVE EXAMPLE 1 (FIG. 5 (b))

The specimen has no groove-paralleling rib 34. The outer cylindrical portion 33 only is projected forward. The ribs 35, 36 and 37 are not rounded.

COMPARATIVE EXAMPLE 2 (FIG. 5 (c))

The specimen has no groove-paralleling rib 34, and the inner and outer cylindrical portions 32, 33 are projected forward. The ribs 35, 36 and 37 are not rounded.

COMPARATIVE EXAMPLE 3 (FIG. 5 (d))

No groove-paralleling rib 34 is formed, and the inner and outer cylindrical portions 32, 33 are projected forward. The ribs 35, 36 and 37 are rounded as at R.

COMPARATIVE EXAMPLE 4 (FIG. 6 (b))

The specimen has groove-paralleling ribs 34, and the inner and outer cylindrical portions 32, 33 are projected forward. The ribs 34, 35, 36 and 37 are rounded as at R.

EXAMPLE 1 (FIG. 6 (c))

The specimen has groove-paralleling ribs 34. The inner and outer cylindrical portions 32, 33 and the groove-paralleling ribs 34 are projected forward. The ribs 34, 35, 36 and 37 are rounded as at R.

EXAMPLE 2 (FIG. 6 (d))

The specimen has groove-paralleling ribs 34. The inner and outer cylindrical portions 32, 33, the groove-paralleling ribs 34 and the vertical ribs 36 are projected forward. The ribs 34, 35, 36 and 37 are rounded as at R.

Figure 7:
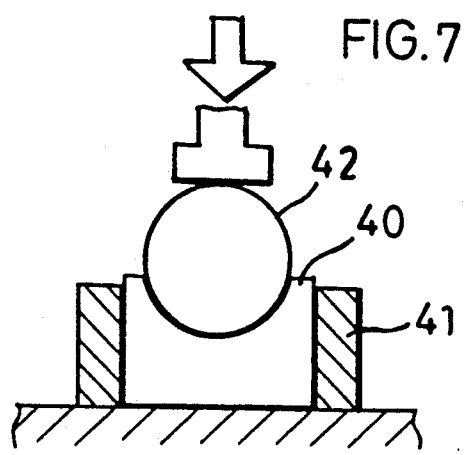
FIG. 7 is a diagram schematically showing how to conduct the crushing test.

These specimens were subjected to a crushing test by the arrangement shown in FIG. 7. The specimen 40 was fitted into a housing 41 equivalent to the housing of an actual device with a rack bar 42 placed thereon, and the specimen 40 was compressed from above at a rate of 50 mm/min to measure the load under which the specimen was crushed. The results are listed below.

| Specimen | Crushing load (t) |
| --- | --- |
| Comparative Example 1 | 2.26 |
| Comparative Example 2 | 2.37 |
| Comparative Example 3 | 3.74 |
| Comparative Example 4 | 3.83 |
| Example 1 | 4.08 |

| Specimen | Crushing load (t) |
| --- | --- |
| Example 2 | 4.11 |

The results achieved by Comparative Examples 2 and 3 indicate that the rounding of the ribs results in greatly improved strength.

The results achieved by Comparative Examples 3 and 4 and Example 1 indicate that the groove-paralleling ribs 34, when provided as projected forward, give improved strength to the rack guide.

The results achieved by Examples 1 and 2 reveal that the positioning of the vertical ribs in the forwardly projected position leads to a slight improvement in strength.

Figure 9:
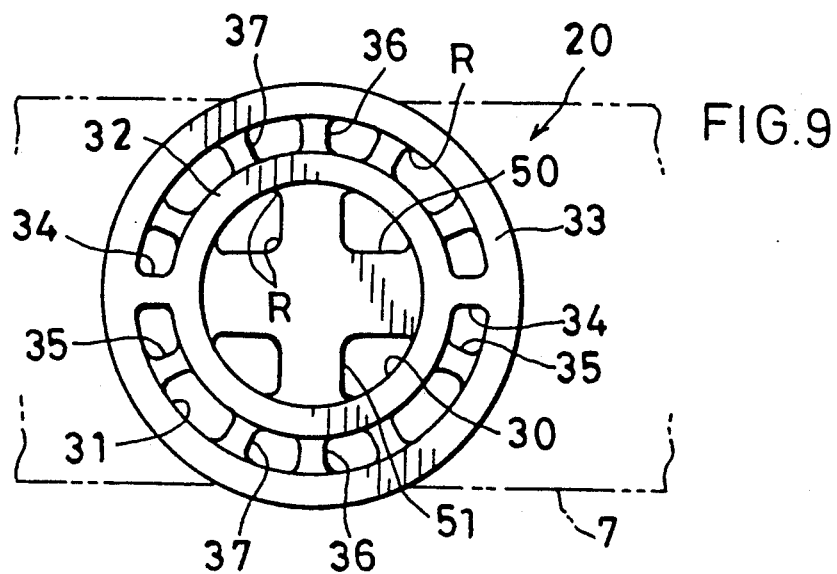
FIG. 9 is a front view showing another example of rack guide.

FIG. 9 shows another embodiment.

In this case, the inner cylindrical portion 32 is internally provided with a groove-paralleling rib 50 and a perpendicular rib 51 which are arranged crosswise. With the exception of this feature, the embodiment has the same construction as the first embodiment; like parts are designated by like reference numerals.

Figure 8:
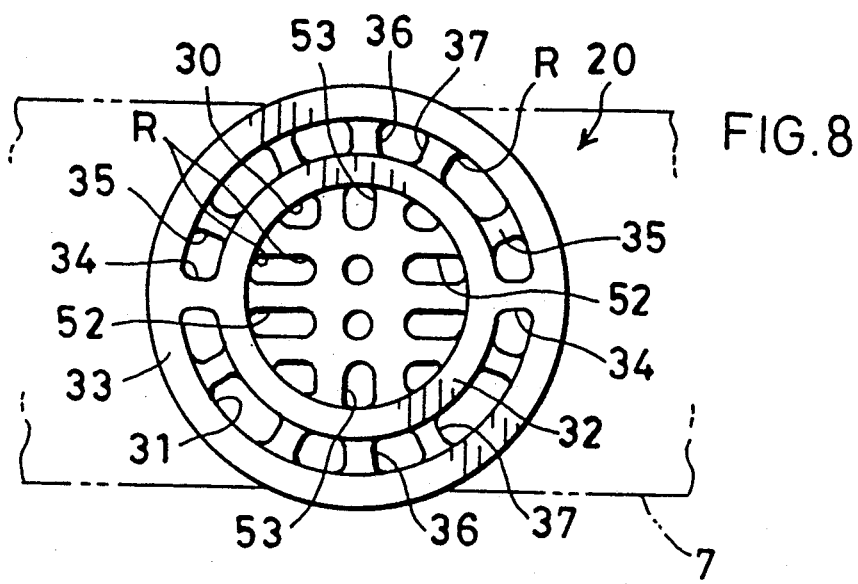
FIG. 8 is a front view showing another example of rack guide.

FIG. 8 shows still another embodiment.

In this case, the inner cylindrical portion 32 is internally formed with a plurality of groove-paralleling ribs 52 and a plurality of perpendicular ribs 53. With the exception of this feature, the embodiment is the same as the first embodiment; like parts are designated by like reference numerals.

What is claimed is:

1. A rack and pinion steering device wherein a housing has accommodated therein a hollow cylindrical rack guide made of synthetic resin and pressed against a rack bar by a spring for guiding the rack bar and preloading the rack relative to the pinion, the rack guide being formed in its one end face with a guide groove for guiding the rack bar, the device being characterized in that the rack guide is a double cylinder having an inner cylindrical portion and an outer cylindrical portion, said inner cylindrical portion having a circular spring accommodating cavity and an annular groove between said inner and outer cylindrical portions and concentric with said spring accommodating cavity, a plurality of ribs in said annular groove between said inner and outer cylindrical portions, said ribs extending diametrically of said cylindrical portions and including a pair of ribs extending parallel to said guide groove and additional ribs spaced circumferential therefrom, the inner cylindrical portion having an end face extending at least flush with an end face of said outer cylindrical portion, at least said ribs extending parallel to said guide groove each having an end face flush with an end face of said inner cylindrical portion.

2. A device as defined in claim 1 wherein the corners of said ribs between said ribs and said cylindrical portions are rounded.

3. A device as defined in claim 1 or 2 wherein said spring accommodating cavity has a spring rearing portion with a rib member parallel to said guide groove and a rib intersecting said rib member at right angles therewith.

4. A device as defined in claim 3 wherein an injection gate for synthetic resin is formed at the center of a surface of said guide groove.

5. A device, as defined in claim 3 wherein reinforcing fiber is filled in said synthetic resin.

6. A device, as defined in claim 4 wherein reinforcing fiber is filled in said synthetic resin.

* * * * *